(12) United States Patent
Niklaus et al.

(10) Patent No.: US 11,603,869 B2
(45) Date of Patent: Mar. 14, 2023

(54) HYDRAULIC CONTROL

(71) Applicant: SOCIETE INDUSTRIELLE DE SONCEBOZ SA, Sonceboz (CH)

(72) Inventors: Joël Niklaus, Bienne (CH); Lionel Billet, Dannemarie sur Crète (FR); Fabrice Boivin, Les Fins (FR)

(73) Assignee: SOCIETE INDUSTRIELLE DE SONCEBOZ SA, Sonceboz (CH)

(*) Notice: Subject to any disclaimer, the term of this patent is extended or adjusted under 35 U.S.C. 154(b) by 379 days.

(21) Appl. No.: 16/761,721

(22) PCT Filed: Nov. 1, 2018

(86) PCT No.: PCT/EP2018/079913
§ 371 (c)(1),
(2) Date: May 5, 2020

(87) PCT Pub. No.: WO2019/091852
PCT Pub. Date: May 16, 2019

(65) Prior Publication Data
US 2020/0340501 A1 Oct. 29, 2020

(30) Foreign Application Priority Data
Nov. 10, 2017 (EP) .................................. 17201210

(51) Int. Cl.
*F15B 13/044* (2006.01)
*H02K 11/33* (2016.01)
(Continued)

(52) U.S. Cl.
CPC .......... *F15B 13/0444* (2013.01); *H02K 11/33* (2016.01); *F16K 31/54* (2013.01); *H02K 1/14* (2013.01); *H02K 11/215* (2016.01)

(58) Field of Classification Search
CPC ... F15B 13/0444; H02K 11/33; H02K 11/215; H02K 1/14; F16K 31/54
See application file for complete search history.

(56) References Cited

U.S. PATENT DOCUMENTS 7,591,448 B2 * 9/2009 Martin ................ F15B 13/0839
137/884
8,339,003 B2 * 12/2012 Prudham ................ H02K 21/14
310/83

FOREIGN PATENT DOCUMENTS

DE    102007031429    1/2009
DE    102014224505    6/2016
(Continued)

OTHER PUBLICATIONS

International Search Report and Written Opinion issued by the European Patent Office, dated Jan. 31, 2019, for International Patent Application No. PCT/EP2018/079913; 23 pages.
(Continued)

*Primary Examiner* — Jianchun Qin
(74) *Attorney, Agent, or Firm* — Faegre Drinker Biddle & Reath LLP

(57) ABSTRACT

Hydraulic control comprising at least one hydraulic valve, each hydraulic valve comprising a hydraulic distributor and an electric actuator. The hydraulic distributor comprises a valve slide mounted with the ability to slide in a body comprising hydraulic ports. The electric actuator is fixed to the body of the hydraulic distributor and comprises an electric motor, an electronic circuit comprising a circuit board, a linear-displacement output member coupled to the control slide, reduction gearing comprising gear wheels coupling the motor to the output member, and a housing in which the electric motor, the electronic circuit and the reduction gearing are mounted.

17 Claims, 13 Drawing Sheets

(51) Int. Cl.
*H02K 11/215* (2016.01)
*F16K 31/54* (2006.01)
*H02K 1/14* (2006.01)

(56) References Cited

FOREIGN PATENT DOCUMENTS

| | | | |
|---|---|---|---|
| EP | 0949747 | 10/1999 | |
| EP | 3188348 | 7/2017 | |
| FR | 2382124 | 9/1978 | |
| FR | 2919441 | 1/2009 | |
| WO | 2010/027447 | 3/2010 | |
| WO | 2013/173269 | 11/2013 | |
| WO | WO-2013173269 A2 * | 11/2013 | ............... F16H 1/20 |
| WO | 2015/162557 | 10/2015 | |
| WO | 2016/124715 | 8/2016 | |
| WO | 2016/128106 | 8/2016 | |

OTHER PUBLICATIONS

English translation of International Preliminary Report on Patentability issued by International Bureau of WIPO, dated May 12, 2020, for International Patent Application No. PCT/EP2018/079913; 12 pages.

* cited by examiner

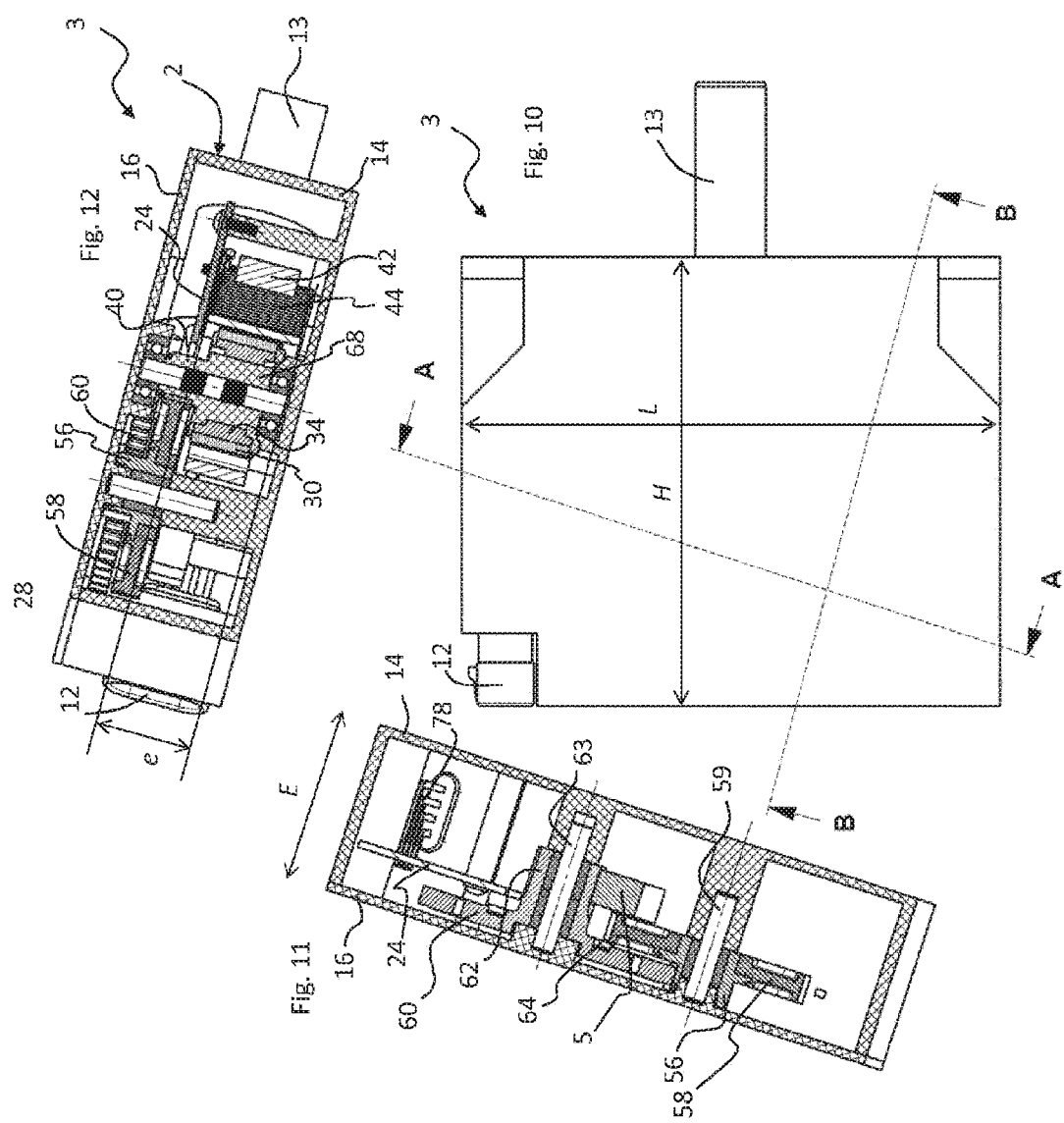

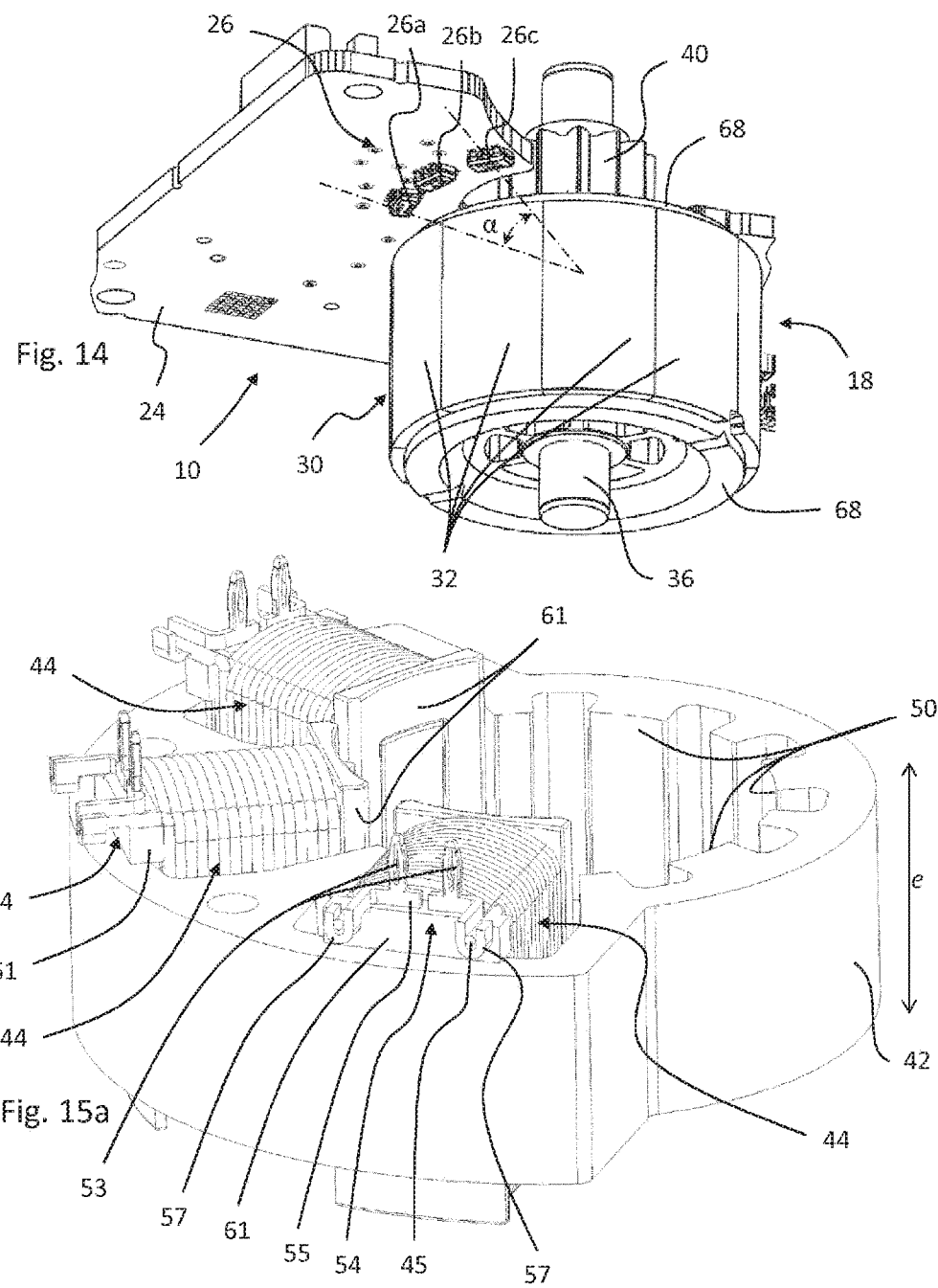

HYDRAULIC CONTROL

CROSS-REFERENCE TO RELATED APPLICATIONS

The present application is a national stage entry of International (PCT) Patent Application Number PCT/EP2018/079913, filed Nov. 1, 2018, which in turn claims priority to European Patent Application No. 17201210.6, filed Nov. 10, 2017, the subject matter of which are expressly incorporated herein by reference.

The present invention relates to the field of hydraulic controls, in particular comprising hydraulic valves, each comprising a hydraulic distributor and an electric actuator.

Hydraulic controls are used in many fields, for example for farm vehicles, construction machines, cranes, and other lifting and handling equipment.

Some hydraulic controls comprise a plurality of juxtaposed hydraulic valves, each valve being formed by a hydraulic distributor coupled to an electric actuator actuating a hydraulic control shaft, in particular a valve slide. An electric actuator for the control of hydraulic distributors is described for example in U.S. Pat. No. 7,591,448.

The hydraulic valves of a hydraulic control are disposed in a juxtaposed manner and spaced by a distance that the actuators of the distributors must respect. The control shaft of the hydraulic distributor is pushed by a preloaded spring which moves it to a safety position (called fail safe position) when the hydraulic system breaks down. To overcome the force of the spring and ensure very dynamic operation, the actuator must provide a high dynamic force.

Due to the demanding environment in which the actuator is used in many hydraulic applications, it is also important that the actuator is robust and reliable, able to withstand vibrations, high-temperature changes and shocks.

The cost of the actuator is also a significant factor.

It is also important, to ensure a reliable operation, to know accurately and reliably the position of the control shaft.

The electric actuator described in U.S. Pat. No. 7,591,448 is certainly compact and accurate, however the production cost of such an actuator is high due to the number of components, the manufacturing cost of the components, and the complexity of the assembly.

An object of the invention is to provide a compact, efficient and reliable hydraulic control.

It is advantageous to provide a hydraulic control which is inexpensive to manufacture.

A particular object of the invention is to provide a hydraulic control with a flat electric actuator for a hydraulic distributor, having a high torque density for its size and which is inexpensive to manufacture.

Another object of the invention is to provide an electric actuator for a hydraulic control which is compact, efficient and reliable.

It is advantageous to provide an electric actuator for a hydraulic control, having a high efficiency.

Objects of the invention are achieved by a hydraulic control according to the independent claims.

The dependent claims describe advantageous characteristics of the invention.

In the present invention, a hydraulic control comprising at least one hydraulic valve is described, each hydraulic valve comprising a hydraulic distributor and an electric actuator. The hydraulic distributor comprises a valve slide slidably mounted in a body comprising hydraulic channels. The electric actuator is fixed to the body of the hydraulic distributor and comprises an electric motor, an electronic circuit including a circuit board, a linear-displacement output member coupled to the control slide, a reduction gear including gear wheels coupling the motor to the output member, and a casing in which the electric motor, the electronic circuit and the reduction gear are mounted.

According to a first aspect of the invention, the gear wheels include at least a first wheel and a second wheel, the second wheel being disposed on the side of a cover of the casing and the electric motor being mounted in the base of the casing. The first wheel comprising a toothed ring engaging a pinion of the rotor and a pinion engaging a toothed ring of the second wheel. The circuit board of the electric motor is disposed between the toothed ring of the second wheel and the electric motor.

The toothed ring of the first wheel is disposed at the height of the board of the circuit, in a cutout of the circuit board.

Advantageously, compared to a stepper motor used for the actuation of a hydraulic valve in the conventional hydraulic controls, the use of a brushless DC motor controlled in a closed loop makes it possible to transmit stronger force peaks to the valve slide and to work in a more secure manner, in particular by having a high reliability of positioning of the output member of the electric actuator.

It should be pointed out that a plurality of stacked or juxtaposed hydraulic distributors may comprise a common and one-piece body (comprising hydraulic channels), or a plurality of assembled bodies (e.g. one per valve).

Advantageously, the electric actuator according to the invention is very compact and in particular characterized by one or more of the following ratios:
- a ratio e/E of a thickness e of the stator of the electric motor, including the winding thickness, to a thickness E of the electric actuator is greater than 0.45, the direction of measurement of the thickness being a direction of stacking or juxtaposition of the hydraulic valves forming the hydraulic control.
- a ratio L/E of a length L of the electric actuator to a thickness E of the electric actuator is greater than 2.5 and less than 4, the direction of measurement of the length being orthogonal to a direction of stacking of the hydraulic valves forming the hydraulic control and a direction of actuation of the valve slide.
- a ratio H/E of a height H of the electric actuator to a thickness E of the electric actuator is greater than 2 and less than 3.5, the direction of measurement of the height being the direction of actuation of the valve slide.

The electric motor includes a stator and a rotor, the rotor comprising a magnet defining a plurality of rotor poles and the stator comprising a magnetic armature and a plurality of coils mounted on the magnetic armature.

According to a second aspect of the invention, the circuit board is disposed above an axial end of the magnet of the rotor, magnetic probes, for example Hall-effect probes, being disposed on the circuit board above the magnetic segments of the magnet, the magnetic probes being disposed in an arc of a circle around the rotor at an angle ($\alpha$) less than 60 degrees.

According to a third aspect of the invention, the rotor comprises a cylindrically-shaped magnet and a cylinder head disposed coaxially inside the cylindrical magnet, the cylinder head and the magnet being mounted in a support made of molded plastic material, the support comprising flanges extending radially above the axial ends of the cylinder head and the magnet.

In one advantageous embodiment, the motor is a brushless DC motor controlled in a closed loop.

In one advantageous embodiment, the coils are mounted on branches of the magnetic armature disposed in an arc of less than 180 degrees about the axis of rotation of the rotor, an axis of rotation of the first wheel of the reduction gear being mounted next to a portion of the stator without coils.

In one advantageous embodiment, the second wheel comprises a position marker disposed on one face of the toothed ring with respect to the circuit board and a position detector is mounted on the circuit board under the position marker.

In one advantageous embodiment, the position detector is in the form of a Hall-effect sensor and the position marker is in the form of an annular magnet.

In one advantageous embodiment, the second wheel of the reduction gear comprises a pinion which engages a rack connected to the linear-displacement output member.

In one advantageous embodiment, the conductive wires of the coils are connected to electrical terminals formed of stamped parts inserted in or overmolded by a plastic material integrally forming the base of the casing and supporting the armature and the coils.

In one advantageous embodiment, the actuator comprises a connector for connecting the electronic circuit to an outer control, a casing of the connector being formed in a manner secured to the base of the casing, electrical terminals of the connector being overmolded in the base of the casing and comprising axially oriented connection portions for a connection with the circuit board.

In one advantageous embodiment, the magnetic armature and the coils, including with electrical terminals for connection to a circuit board, are overmolded in the plastic material forming the base of the casing.

In one advantageous embodiment, the clearance between the external diameter of the cylinder head and the internal diameter of the magnet is in a range from 50 to 200 microns.

In one advantageous embodiment, the support of the rotor comprises a pinion secured to the support formed from an injected plastic material.

In one embodiment, the hydraulic control comprises a preloaded return spring acting on the valve slide. In one variant, the return spring is mounted at an interface between the body of the hydraulic distributor and the electric actuator, in a housing formed in the casing of the electric actuator.

Other advantageous objects and aspects of the invention will become apparent upon reading the claims and/or the detailed description below of embodiments of the invention in relation to the figures, in which:

FIG. 10 is a view of an electric actuator of the hydraulic control according to FIG. 8;

FIG. 11 is a sectional view through the line A-A of the actuator according to FIG. 10;

FIG. 12 is a sectional view through the line B-B of the actuator according to FIG. 10;

FIG. 14 is a perspective view of a rotor of an electric actuator of a hydraulic control according to one embodiment of the invention;

FIG. 15a is a perspective view of a stator of an electric actuator of a hydraulic control according to one embodiment of the invention;

Figure 1:
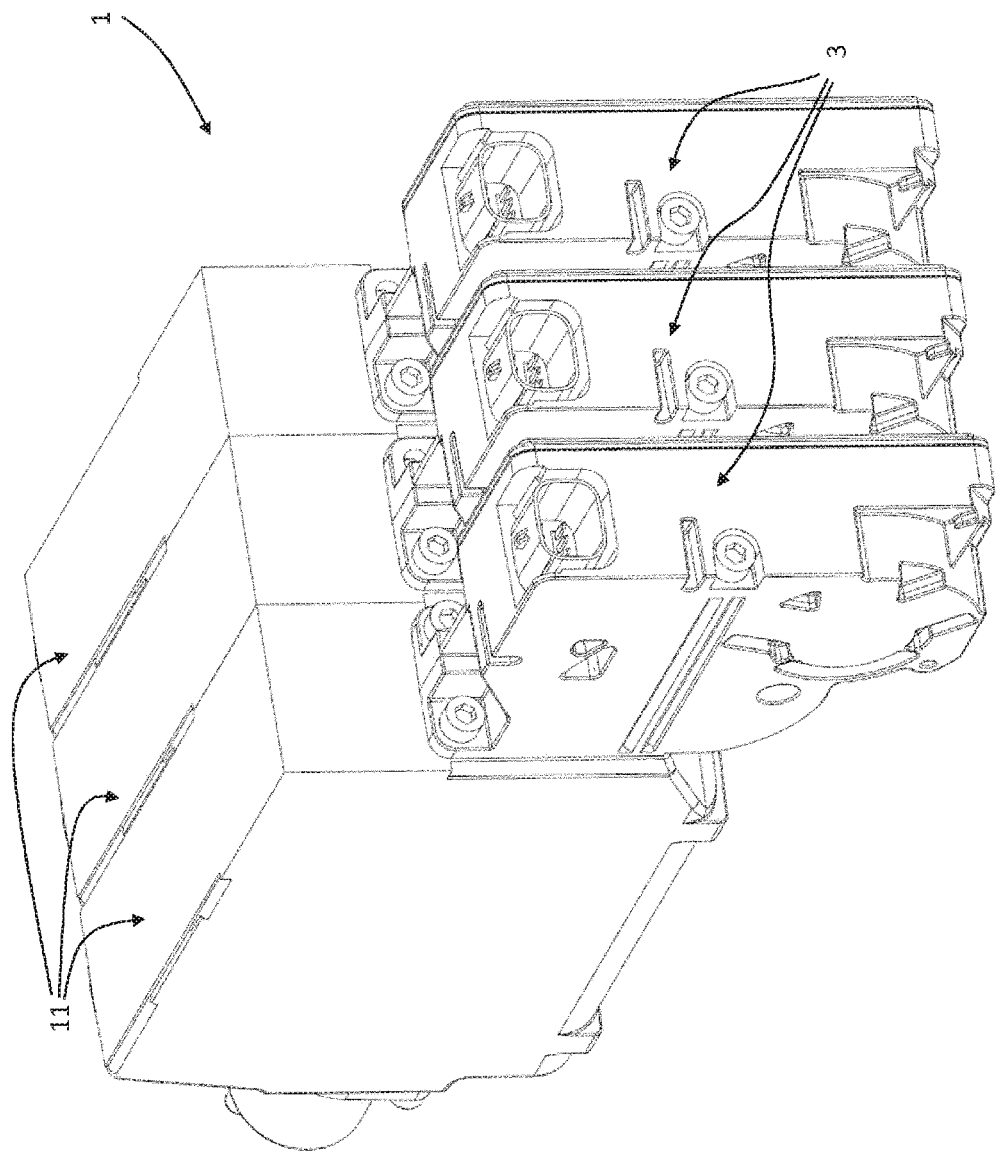
FIG. 1 is a perspective view of a hydraulic control according to a first embodiment of the invention.

Referring to the figures, starting with FIGS. 1, 2, 8 and 9, a hydraulic control 1 comprises a plurality of juxtaposed or stacked hydraulic valves 11, 3. Each hydraulic valve comprises a hydraulic distributor 11 and a corresponding electric actuator 3, a single electric actuator being associated with a single hydraulic distributor.

Each hydraulic valve comprises a valve slide 13 slidably mounted in a body 19 comprising hydraulic channels 17. The position and configuration of the hydraulic channels as well as the profile (not illustrated) of the valve slide are adapted to the hydraulic function and are known per se and will not be described in more detail herein. The number of juxtaposed valves forming the hydraulic control 1 can vary depending on the application. Given the stacked arrangement of the valves, there is an advantage that the distributors and the actuators have a small space requirement in the direction of the juxtaposition. The electric actuator 3 therefore has a thickness E limited by the thickness of the hydraulic distributor 11. The electric actuator is fixed to the body 19 of the hydraulic distributor on an interface 21 of the body constituting one of the minor faces of the body.

Referring in particular to FIGS. 3-7a and 10-13, the electric actuator comprises an electric motor 6, an electronic circuit 10 including a circuit board 24, a linear-displacement output member 4 coupled to the valve slide 13, a reduction gear 8 including gear wheels 22 coupling the motor to the output member, and a casing 2 in which the electric motor 6, the electronic circuit 10 and the reduction gear 8 are mounted. The output member 4 is connected or secured to a rack 5 disposed in the casing 2 of the electric actuator.

The motor 6 of the electric actuator is a brushless DC motor controlled in a closed loop. Compared to a stepper motor used for the actuation of a hydraulic valve in the conventional hydraulic controls, the use of a brushless DC motor controlled in a closed loop makes it possible to transmit stronger force peaks to the valve slide and to work in a more secure manner, in particular by having a high reliability of positioning of the output member of the electric actuator.

The hydraulic control 1 can comprise, for each hydraulic valve, a preloaded return spring 15. The valve slide is pushed by the preloaded return spring 15 which moves it into a safety position (called fail safe position) when the hydraulic system breaks down. To overcome the force of the return spring 15 and ensure very dynamic operation, the electric actuator must provide a high dynamic force. The choice of a brushless DC motor controlled in a closed loop makes it possible to meet this requirement reliably, in an economical and compact configuration.

Figure 2:
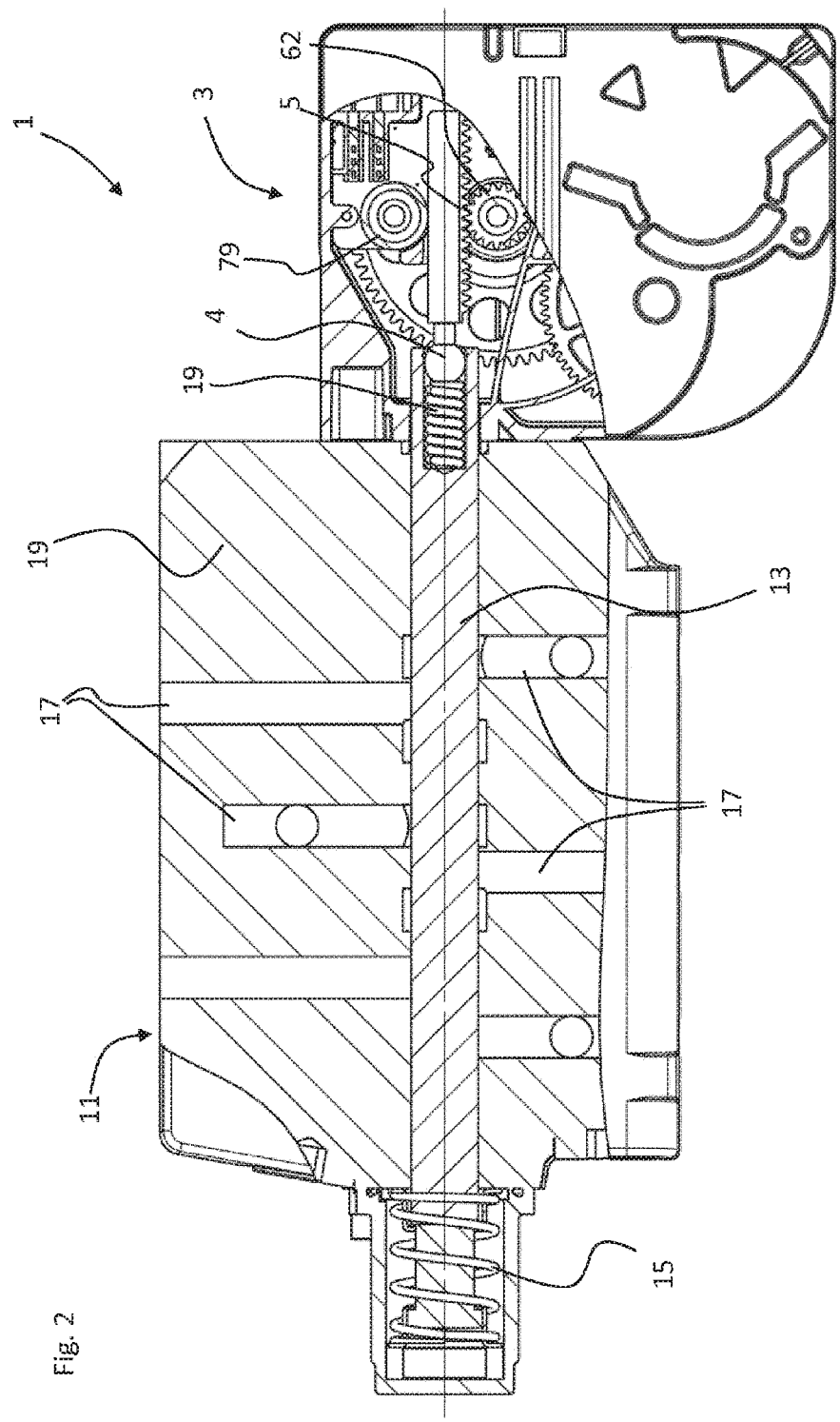
FIG. 2 is a sectional view of the hydraulic control according to FIG. 1.
Figure 3:
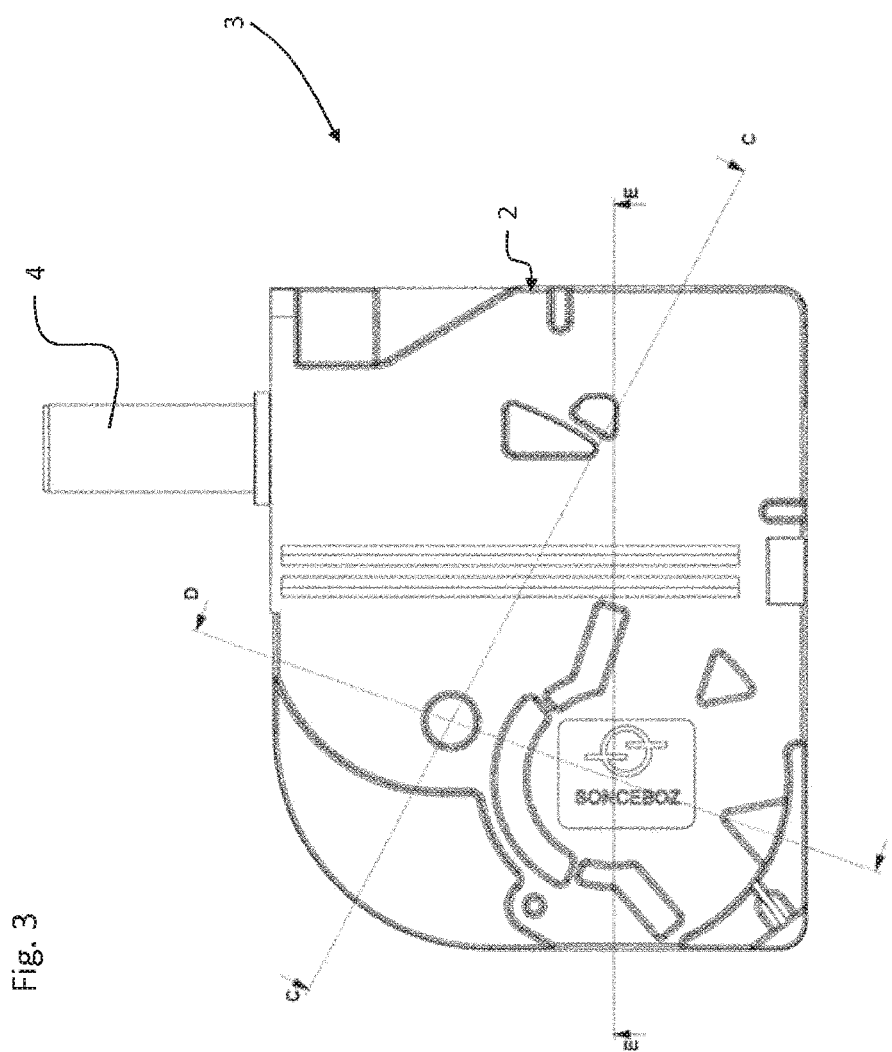
FIG. 3 is a view of an electric actuator of the hydraulic control according to FIG. 1.
Figure 4:
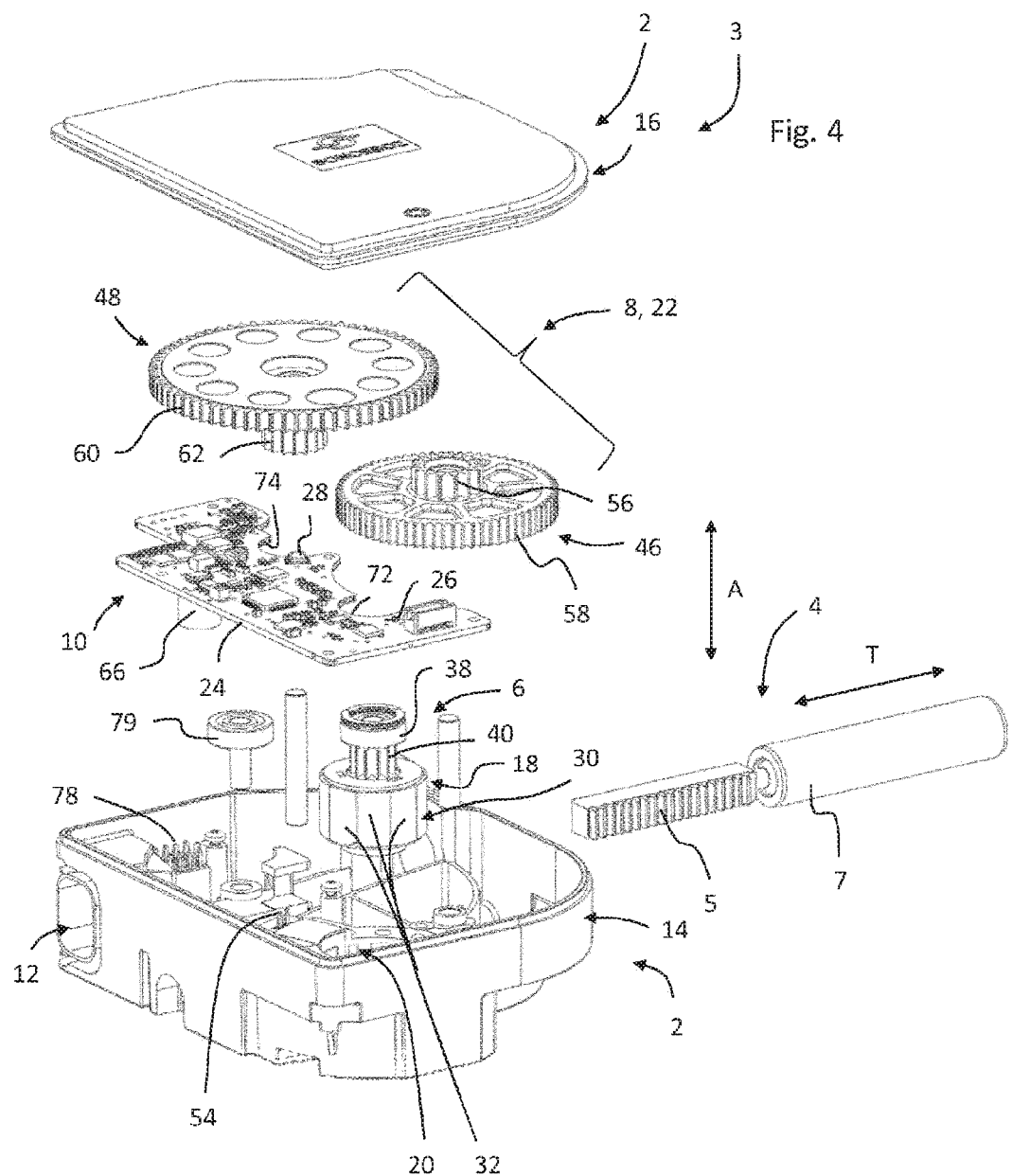
FIG. 4 is an exploded perspective view of the electric actuator according to FIG. 3.
Figure 5:
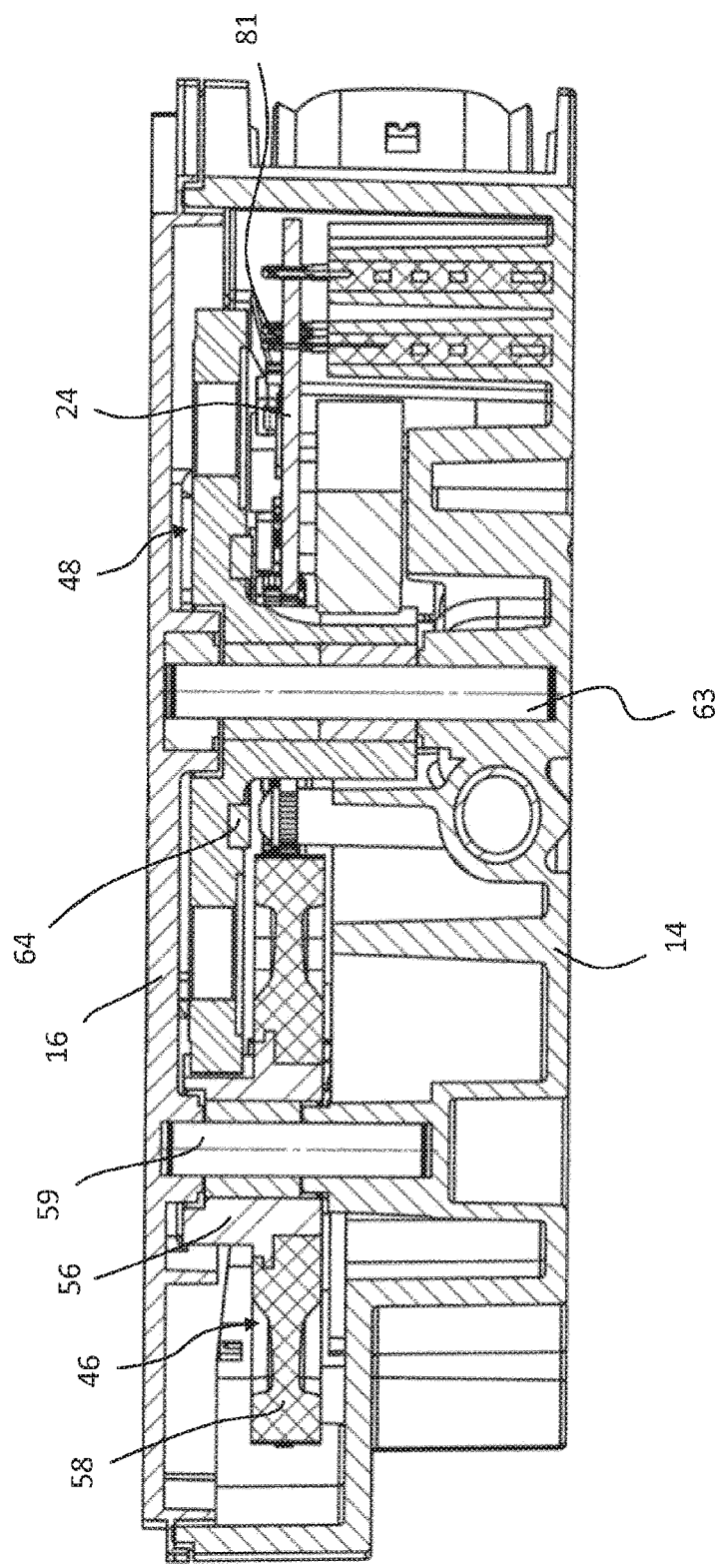
FIG. 5 is a sectional view through the line C-C of the actuator according to FIG. 3.
Figure 6:
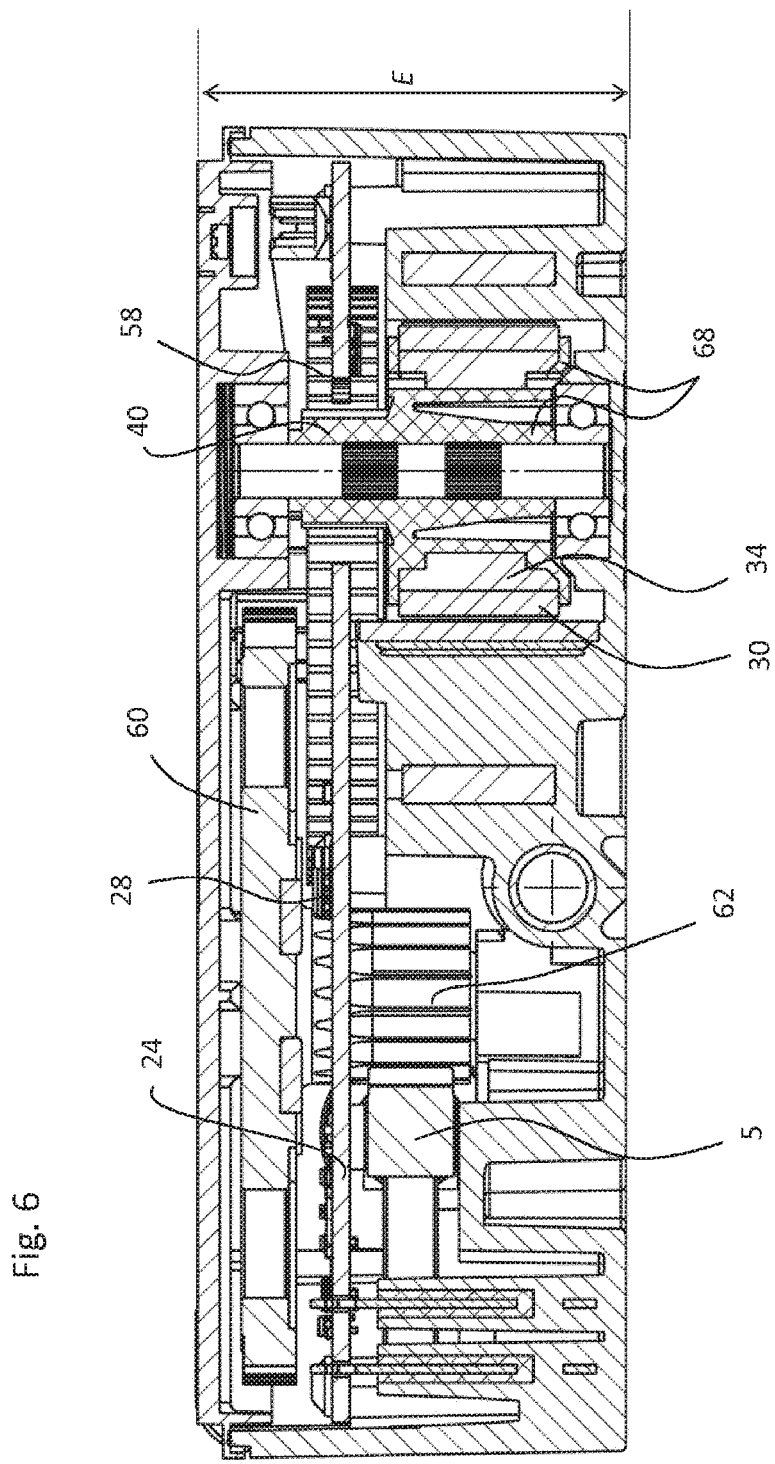
FIG. 6 is a sectional view through the line E-E of the actuator according to FIG. 3.
Figure 7:
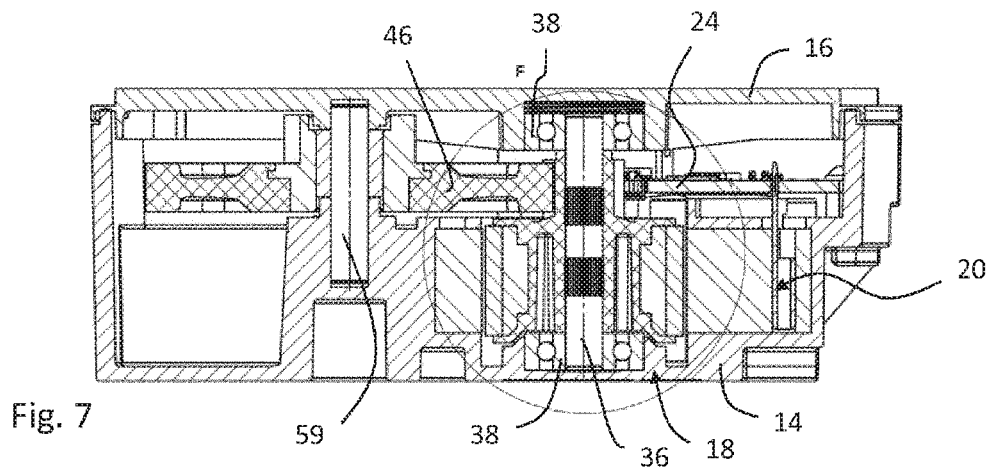
FIG. 7 is a sectional view through the line D-D of the actuator according to FIG. 3.
Figure 7A:
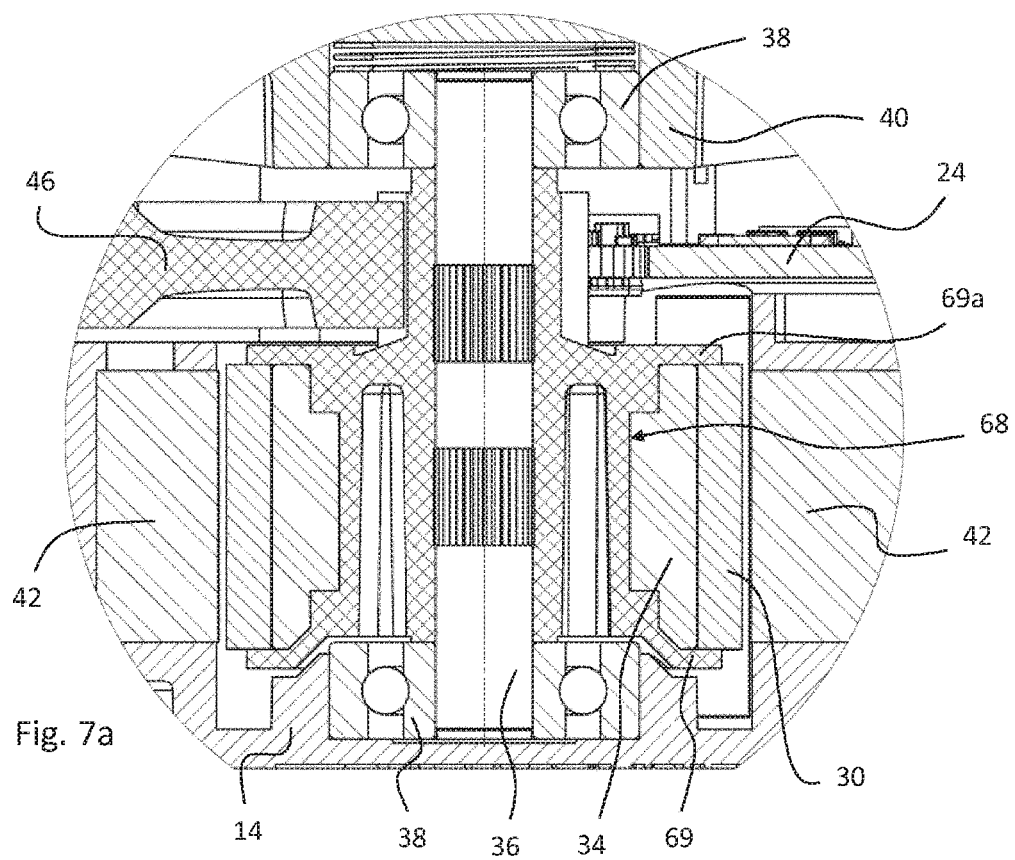
FIG. 7a is an enlarged view of part of FIG. 7.

In a first variant, illustrated in FIGS. 1 and 2, the return spring 15 is mounted in a housing in the body 19 of the hydraulic distributor 11.

Figure 8:
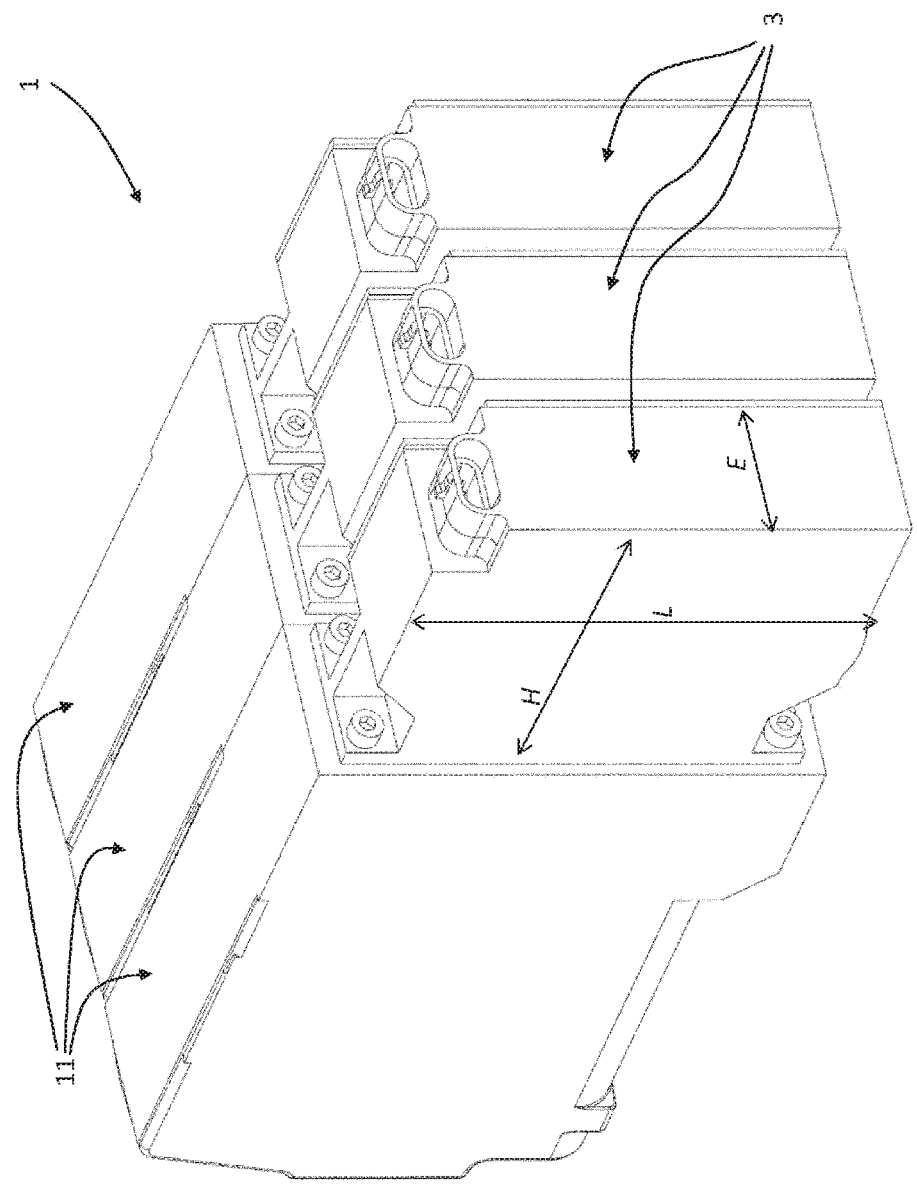
FIG. 8 is a perspective view of a hydraulic control according to a second embodiment of the invention.
Figure 9:
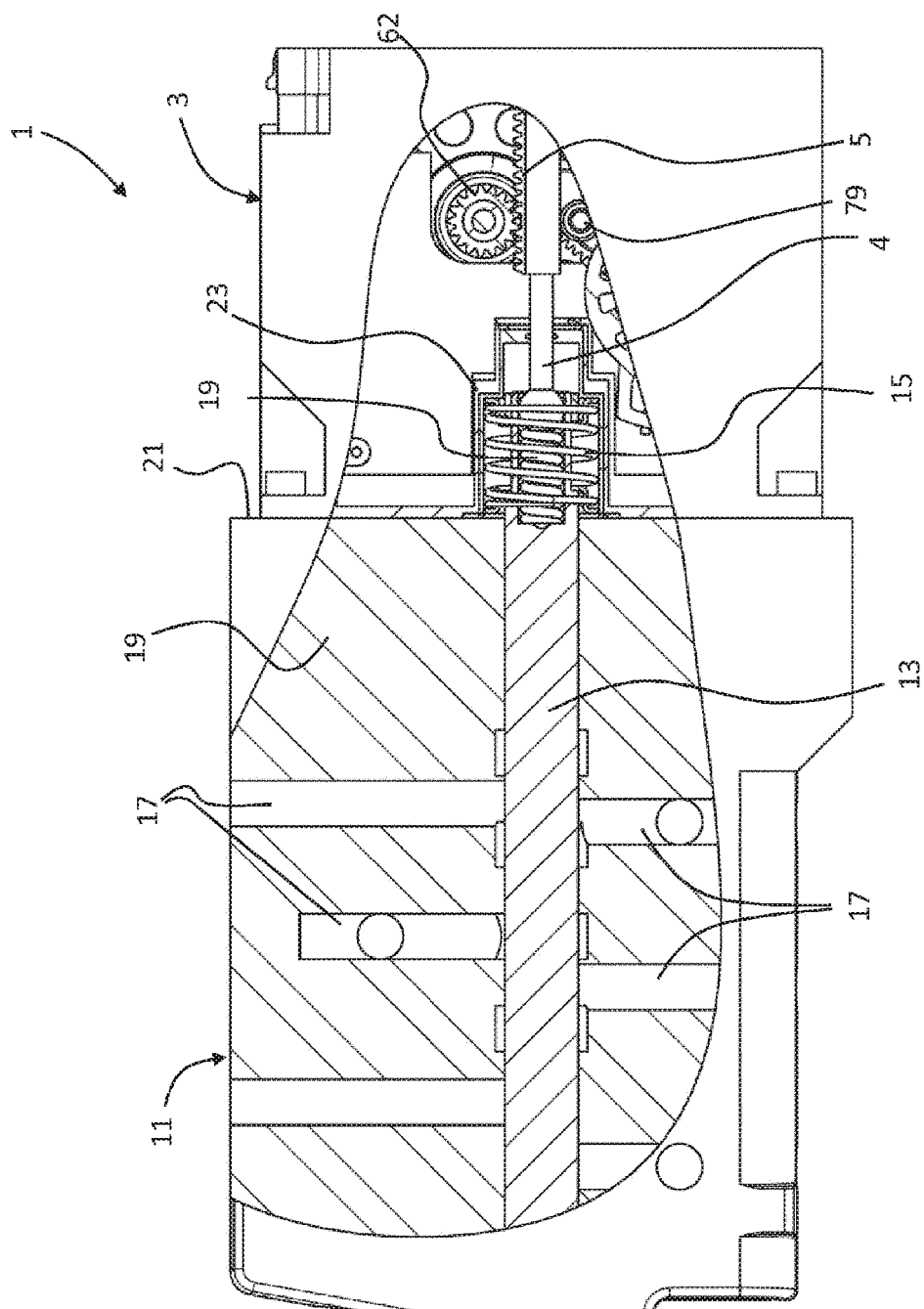
FIG. 9 is a sectional view of the hydraulic control according to FIG. 8.
Figure 13:
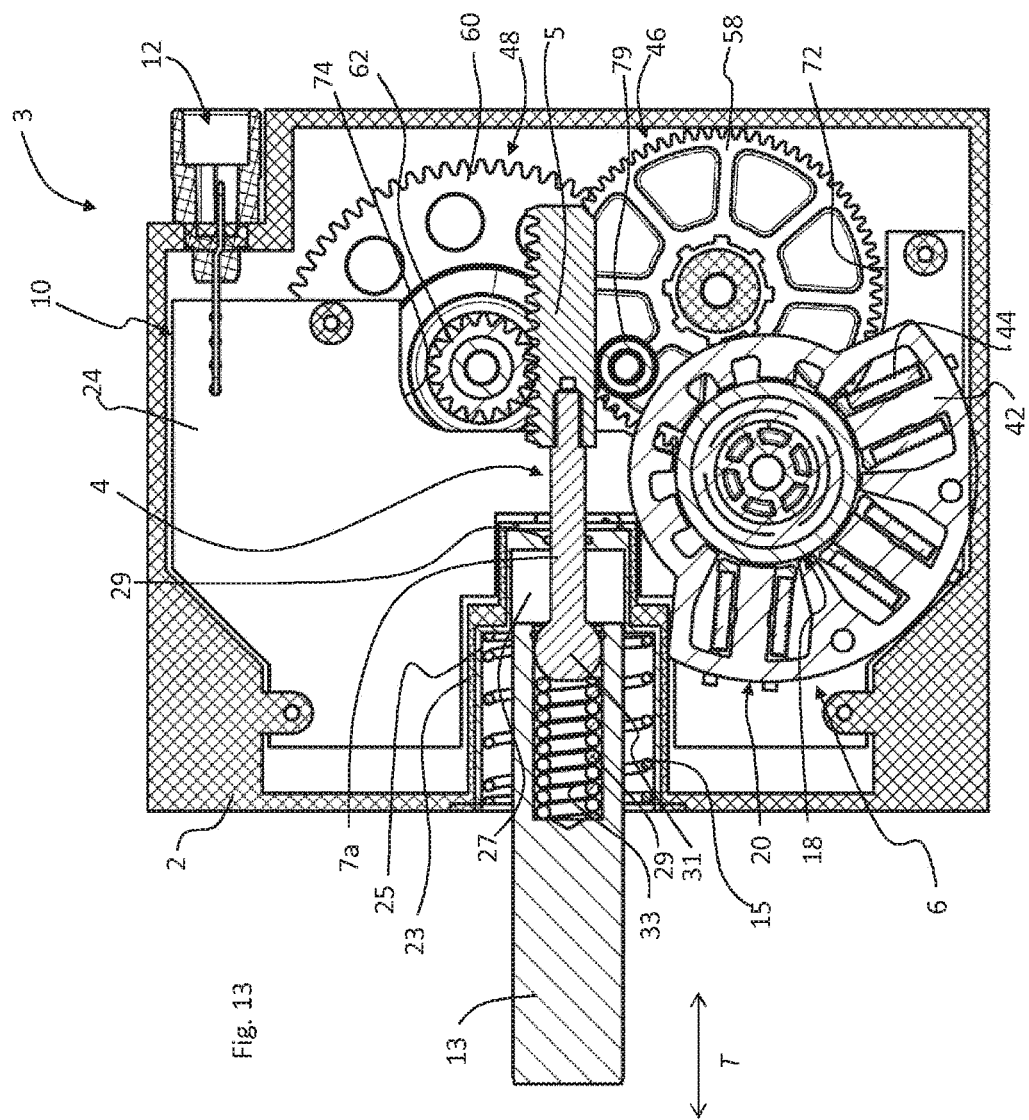
FIG. 13 is a sectional view of the actuator according to FIG. 10.

In a second variant, illustrated in FIGS. 8 and 9, the return spring 15 is mounted at the interface between the body 19 and the electric actuator, in a casing 23 formed in the casing 2 of the electric actuator. The shaft of the output member 4 of the electric actuator 3 comprises a coupling portion 7a mounted in a chamber 27 of the hydraulic distributor in which the return spring 15 is mounted. The chamber 27 is closed by a cap 25 mounted on the body of the hydraulic distributor, the chamber being filled with hydraulic fluid. A seal 29 is disposed between an orifice in the wall of the cap 25 and the shaft 7a of the output member to ensure the sealing between the hydraulic circuit and the electric actuator. For the assembly of the actuator 3 and of the distributor 11, the rack 5 is preassembled to the output member 4, and when fixing the electric actuator 3 to the hydraulic distributor 11, is inserted in the casing 2 between the support rolling 79 and the pinion 62.

The output member 4 can be coupled to the valve slide 13 by means of a removable connection configured to absorb positioning tolerances, for example in the form of a ball joint. In this example, the output member 4 may comprise a partially spherical coupling portion 31 inserted in a housing 33 at the end of the valve slide. A preloaded backlash spring 29 in the housing 33 bears the coupling portion 31 against an abutment in the housing in order to eliminate the positioning clearance in the transverse direction T between the output member 4 and the valve slide 13.

The casing 2 of the electric actuator comprises a base 14 and a cover 16 which closes the open side of the base. The base 14 of the casing forms a volume inside which the motor 6, the reduction gear 8 and the electronic circuit 10 are mounted. The cover 16 and the base 14 can advantageously be manufactured from an injected plastic material, the edge of the cover 16 being welded to the edge of the base 14, for example by ultrasonic or laser welding, in order to ensure a hermetic sealing between the cover 16 and the base 14.

The motor 6 comprises a rotor 18 and a stator 20. The motor is advantageously in the form of a brushless DC motor.

In one embodiment, the rotor 18 comprises a magnet 30 forming a plurality of magnetic poles, for example a cylindrically-shaped magnet including a plurality of magnetized segments with alternating polarities disposed on the circumference of the cylinder. The rotor 18 can advantageously comprise a cylinder head 34 disposed coaxially inside the cylindrical magnet, the cylinder head 34 being formed from a material with high magnetic permeability, such as soft iron.

In one advantageous embodiment, the cylinder head 34 and the magnet 30 are mounted in a support 68 made of overmolded plastic material, the support comprising flanges 69a, 69b extending radially above the axial ends of the cylinder head 34 and of the magnet 30. The external diameter of the cylinder head 34 is slightly smaller than the internal diameter of the magnet 30, the clearance between these two diameters being in a range from 50 to 200 microns, configured to compensate for a difference in thermal expansion between the cylinder head 34 and the magnet 30. In order to maximize the magnetic efficiency and consequently the residual torque of the motor, the space between the cylinder head 34 and the magnet 30 should be as small as possible while allowing sufficient clearance for the differences in thermal expansion and also easy assembly of the cylinder head 34 in the magnet 30.

The overmolding of the radial flanges above the axial ends of the cylinder head 34 and of the magnet 30 advantageously makes it possible to fix the magnet 30 to the cylinder head 34 with the smallest desired clearance without requiring the use of an adhesive or another fixing means between the cylinder head 34 and the magnet 30.

The support 68 may further comprise a pinion 40 secured to the support 68, for example advantageously formed from a plastic material injected at the same time as the support 68. The support 68 may be hollow in order to insert a shaft 36, rolling 38 being mounted at the ends of the shaft 36 in order to support the rotor in rotation in the casing 2.

The stator 20 comprises a magnetic armature 42 and coils 44 mounted on arms of the magnetic armature 42. The magnetic armature 42 is made of a material with high magnetic permeability such as soft iron. The teeth 50 of the magnetic armature 42 define a number of magnetic poles. The coils 44 are formed by conductive wires connected to electrical terminals 54.

The electrical terminals 54 can be formed of stamped parts.

In one embodiment illustrated in FIG. 15a, the pair of terminals 54 for the two ends of a wire 45 of a coil can be formed in a single stamped part overmolded by the plastic material supporting the armature 42 and the coils 44, a bridge 55 between the two terminals 54 then being cut out after the overmolding operation or when the stamped part is still in the overmold.

The terminals can also be inserted in the plastic material supporting the armature. The electrical terminals 54 may advantageously comprise a connection portion to be crimped 57 to the wire of the coil, allowing automated and rapid manufacture of the coils and their interconnection to the electronic circuit 10.

The terminals may advantageously comprise a portion in the form of pins 53 oriented in an axial direction A configured to be inserted in complementary conductive holes of a circuit board 24 of the electronic circuit 10.

Figure 15B:
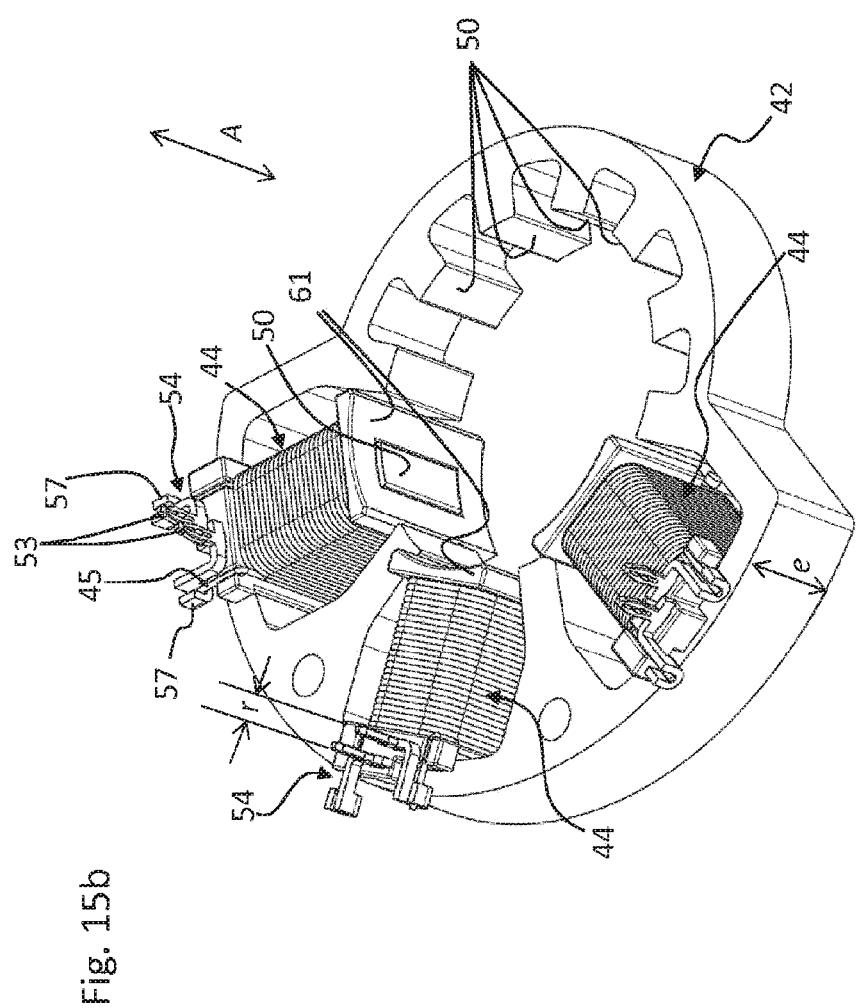
FIG. 15b is a perspective view of a stator of an electric actuator of a hydraulic control according to one embodiment of the invention.

In one embodiment illustrated in FIG. 15b, the pins 53 are offset by a distance r in a radial direction in order to have a compact arrangement while ensuring a sufficient distance between the pins for connection to the printed circuit.

The magnetic armature 42 and the coils 44 can advantageously be directly overmolded in the plastic material forming the base 14, including with the electrical terminals 54 ready to be coupled to the circuit board 24.

The rotor 6 can be inserted axially in the stator which is directly integrated in the base of the casing.

The reduction gear 8 comprises gear wheels 22 comprising a first wheel 46 and a second wheel 48. The first wheel 46 comprises a toothed ring 58 engaging the pinion 40 of the rotor 18. A shaft 59 supporting the rotation of the first wheel 46 is mounted at the ends in housings formed in the base 14 and in the cover 16. Similarly, the second wheel 48 comprises a shaft 63 mounted at the ends of the housings formed in the base and the cover.

The axes 59 and 63, like the rotor 18 and the gear wheels 22 as well as the circuit board 24, can all be assembled in an axial direction A in the base 14 making it possible to simplify the assembly operations.

The second wheel 48 of the reduction gear 8 comprises a pinion 62 which engages the rack 5. The rack 5 can be supported on its back by a rolling 79 so that the rack 5 comprises a support on the two opposite sides to guide them in the transverse direction T of linear displacement of the output member 4.

Relative to the rotor 18 of the motor 6, the toothed ring 60 of the second wheel 48 is disposed on the other side of the circuit board 24 relative to the magnet 30 of the rotor 18. The circuit board 24 advantageously comprises cut out portions 74, 72, a first cutout 72 allowing the axial passage of the circuit board 24 to make the partial turn of the pinion 40 and of the toothed ring 58 of the first wheel 46 which is disposed at the height of the circuit board. The circuit board 24 can therefore be disposed just above an axial end of the magnet 30 of the rotor 18, Hall-effect position sensors 26 being disposed on the circuit board 24 above the magnetic segments 32 of magnet 30.

The magnetic probes 26a, 26b, 26c, for example of the Hall-effect sensors, can advantageously be disposed close to each other, the probes being in particular spaced apart at an angle α about the axis of rotation of the lower rotor at 60 degrees. In other words, the probes are disposed in an arc of a circle around the rotor smaller than 60 degrees. In the illustrated example, there are three magnetic probes 26a, 26b, 26c, but in variants it is possible to have two, four, or more probes to detect the position and the speed of the rotor. For a rotor formed by 5 pairs of poles, the probes 26a, 26b, 26c can in particular have an angle of 24 degrees between adjacent probes in order to form an electrical angle of 120 degrees. The disposition of the magnetic probes 26a, 26b, 26c according to the embodiment of the invention described above, makes it possible to reduce the size of the circuit board 24 and leave more room for the stator 20 and the reduction gear 8 in order reduce the space requirement, in particular in the axial direction A of the actuator. The magnetic probes 26 make it possible to detect the position and the speed of the rotor 18 in a very compact and inexpensive configuration.

The stator 20 of the motor comprises a magnetic armature 42, three coils 44 mounted on branches of the magnetic armature disposed asymmetrically around the rotor 18, and in particular disposed in an arc of a circle around the rotor 18 of less than 180 degrees. Poles of the stator on the opposite side of the coils 44 are formed by teeth 50 of the armature without coils, this making it possible to have a stator 30 of small diameter on the opposite side of the coils. The shaft 59 of the first wheel 46 of the reduction gear 8 is mounted next to the portion of the stator 20 without coils so as to have a small distance with the shaft of the rotor 18 to reduce the diameter of the first wheel 46, for a compact configuration.

The teeth 50 can have different widths (in the direction of rotation of the rotor), for example a first series of teeth with a width greater than a second series of interposed teeth as illustrated in FIG. 15a, or all the teeth 50 can be of the same width as illustrated in FIG. 15b.

The toothed ring 60 of the second wheel 48 is disposed above the circuit board 24, the pinion 62 of the second wheel 62 extending through a cutout 74 in the circuit board to engage the rack 5 disposed below the circuit board 24. The second wheel 48 may advantageously comprise a position marker 64 disposed on one face of the toothed ring 60 with respect to the circuit board 24. A position detector 28 can be mounted on the circuit board 24 under the position marker 64. In one advantageous variant, the position detector 28 may be in the form of a Hall-effect sensor and the position marker 64 may be in the form of an annular magnet, for example a segmented annular magnet allowing the Hall-effect sensor to detect the displacement of the second wheel 48. The second wheel 48 being directly coupled to the rack 5, the position detector 28 of the toothed ring 60 allows providing the position of the output member 4. The integration of the position detector 28 directly on the circuit board 24 makes it possible to have a particularly compact and inexpensive disposition while ensuring the reliability of positioning of the output member. Alternatively, the position marker 64 and the probe may be optical. For example, the position marker 64 may comprise light and dark segments and the position detector 28 on the circuit board 24 comprises a light source and an optical sensor for detecting the passage of the segments.

The electronic circuit 10 may comprise capacitors 66 used in particular for the filtering of electrical interference. These capacitors 66 take up a certain volume and can be disposed on the circuit board 24 oriented towards the base 14 of the casing 2, on the same side as the rotor 18.

The electronic circuit 10 can be connected to an outer control by a connector 12, the casing of the connector being formed in a manner secured to the base 14 of the casing. Electrical terminals 78 of the connector 12 can be overmolded directly into the base 14 of the casing, the terminals 78 comprising connection portions in the form of pins 81 axially oriented for a press-fit connection with conductive holes on the circuit board 24 when it is inserted axially in the base 14 of the casing during its assembly.

Advantageously, the overmolding of the stator 20 of the motor 6, of the connections of the coils 44 of the motor, and of the electrical terminals 78 of the connector 12 directly in the base 14 of the casing, by also forming the bearings for the rolling of the rotor as well as the housings for the axes of rotation of the gear wheels in the base make it possible to provide an inexpensive and very compact actuator. The disposition of the second gear wheel 60 of the reduction gear 8 above the circuit board 24, engaging the first gear wheel 58 below the circuit board 24, with the pinion 62 passing through a cutout in the board 24, allows having a small space requirement in the axial direction A, while offering a large reduction, which allows using a high speed brushless motor and providing a high residual torque. Furthermore, the disposition of the coils of the motor as well as the position sensors 26a, 26b, 26c of the rotor in a reduced arc of a circle, make it possible to have the first gear wheel close to the rotor while keeping the axial height of the low actuator.

The electric actuator according to the invention is very compact and in particular is characterized by dimension ratios (see FIGS. 8, 10, 11, 12, 15) described below.

According to an advantageous aspect of the invention, the ratio e/E of the thickness e of the stator, including the winding thickness, to the thickness E of the electric actuator is greater than 0.45, the direction of measurement of the thickness being the direction of stacking or juxtaposition of the hydraulic valves forming the hydraulic control.

According to an advantageous aspect of the invention, the ratio L/E of the length L of the electric actuator 3 to the thickness E of the electric actuator is greater than 2.5 and less than 4, the direction of measurement of the length being orthogonal to the direction of stacking of the hydraulic valves forming the hydraulic control and the direction of actuation of the valve slide.

According to an advantageous aspect of the invention, the ratio H/E of the height H of the electric actuator 3 to the thickness E of the electric actuator is greater than 2 and less than 3.5, the direction of measurement of the height being the direction of actuation of the valve slide.

These advantageous ratios making it possible to provide a compact actuator are summarized in the following table:

| L/E | H/E | e/E |
| --- | --- | --- |
| >2.5 | >2 | >0.45 |
| <4 | <3.5 | |

By way of illustration, examples of electric actuators according to advantageous embodiments of the invention can have the following dimensions:

| Dimensions in mm | | | | | | | |
|---|---|---|---|---|---|---|---|
| Actuator | | | Stator | Ratios and differences | | | |
| Thickness (E) | Length (L) | Height (H) | Thickness (e) | L/E | H/E | e/E | E-e |
| 40 | 125 | 100 | 22 | 3.1 | 2.5 | 0.55 | 18 |
| 32 | 125 | 100 | 16 | 3.9 | 3.1 | 0.50 | 16 |
| 48 | 125 | 100 | 30 | 2.6 | 2.1 | 0.63 | 18 |

LIST OF THE REFERENCES IN THE FIGURES

Hydraulic control 1
  Hydraulic valve
  Hydraulic Distributor 11
    Body 19
    Valve slide 13
      Housing 33
      Backlash spring 19
    Return spring 15
    Hydraulic channels 17
  Interface 21
    Cap 25
    Spring chamber 27
    seal 29
  Actuator 3
    Casing 2
      Base 14
      Cover 16
      Housing 23 (to receive the return spring)
    Output member 4
      Rack 5
        Guide rolling 79
      Shaft 7
        Coupling portion 31
          Spherical head
    Motor 6
      Rotor 18
        Magnet 30
          Poles 32
        cylinder head 34
        Shaft 36
        Bearings 38
          Rolling
        Pinion 40
        Support 68 (overmolding)
          flange 69
      Stator 20
        Magnetic armature 42
          Teeth 50
        Coil 44
          Conductive wire 45
          Electrical terminals 54
          Bridge 55
            connection portions to be crimped 57
            connection pins 53
          overmolding 61
    Reduction gear 8
      Gear wheels 22
        First wheel 46
          Pinion 56
          Toothed ring 58
          Shaft 59
        Second wheel 48
          Toothed ring 60
          Position marker (magnet) 64
          Pinion 62
          Shaft 63
    Electronic circuit 10
      Circuit board 24
        cutout 72 (for the first gear wheel)
        cutout 74 (for output pinion)
      Position sensor of the rotor 26
        (Hall-effect) magnetic probes 26a, 26b, 26c
      Position sensor of the second wheel 28
      Capacitors 66
    Connector 12
      Terminals 78
        pins 81

The invention claimed is:

1. A hydraulic control comprising:
at least one hydraulic valve, each hydraulic valve including:
  a hydraulic distributor comprising:
    a body with hydraulic channels; and
    a valve slide slidably mounted in the body; and
  an electric actuator fixed to said body, the electric actuator comprising:
    a brushless DC electric motor controlled in a closed loop,
    an electronic circuit including a circuit board,
    a linear-displacement output member coupled to the valve slide,
    a reduction gear including gear wheels coupling the electric motor to the output member, and
    a casing in which the electric motor, the electronic circuit and the reduction gear are mounted,
  wherein the electric motor comprises a rotor and a pinion, the rotor comprising a magnet defining a plurality of rotor poles, the gear wheels include at least a first wheel and a second wheel, the first wheel comprising a first pinion and a first toothed ring, the second wheel comprising a second pinion and a second toothed ring, the second wheel being disposed on the side of a cover of the casing and the electric motor being mounted in the base of the casing, the first toothed ring engaging the pinion of the electric motor and the first pinion engaging the second toothed ring, the circuit board being disposed between the second toothed ring and the magnet of the electric motor.

2. The hydraulic control according to claim 1, wherein a ratio e/E of a thickness e of the stator, including the winding thickness, of the electric motor to a thickness E of the electric actuator is greater than 0.45, the direction of measurement of the thickness being a direction of stacking of the hydraulic valves forming the hydraulic control.

3. The hydraulic control according to claim 1, wherein a ratio L/E of a length L of the electric actuator to a thickness E of the electric actuator is greater than 2.5 and less than 4, the direction of measurement of the length being orthogonal to a direction of stacking of the hydraulic valves forming the hydraulic control and a direction of actuation of the valve slide.

4. The hydraulic control according to claim 1, wherein a ratio H/E of a height H of the electric actuator to a thickness E of the electric actuator is greater than 2 and less than 3.5, the direction of measurement of the height being the direction of actuation of the valve slide.

5. The hydraulic control according to claim 1, wherein the first toothed ring is disposed at the height of the circuit board, in a cutout of the circuit board.

6. The hydraulic control according to claim 1, wherein the second wheel comprises a position marker disposed on one face of the second toothed ring with respect to the circuit board and a position detector is mounted on the circuit board under the position marker.

7. The hydraulic control according to claim 6, wherein the position detector is in the form of a Hall-effect sensor and the position marker is in the form of an annular magnet.

8. The hydraulic control according to claim 1, wherein the second wheel of the reduction gear comprises a pinion which engages a rack connected to the linear-displacement output member.

9. The hydraulic control according to claim 1, wherein the circuit board is disposed above an axial end of the magnet of the rotor, magnetic probes being disposed on the circuit board above the magnetic segments of the magnet, the magnetic probes being disposed in an arc of a circle around the rotor at an angle ($\alpha$) less than 60 degrees.

10. The hydraulic control according to claim 1, wherein the motor comprises a cylinder head and the rotor includes a cylindrically-shaped magnet, the cylinder head being disposed coaxially inside the cylindrical magnet, the cylinder head and the magnet being mounted in a support made of overmolded plastic material, the support comprising flanges extending radially above the axial ends of the cylinder head and the magnet.

11. The hydraulic control according to claim 10, wherein the clearance between the external diameter of the cylinder head and the internal diameter of the magnet is in a range from 50 to 200 microns.

12. The hydraulic control according to claim 10, wherein the support comprises a pinion secured to the support formed from an injected plastic material.

13. The hydraulic control according to claim 1, wherein the motor comprises a stator including a magnetic armature and a plurality of coils mounted on branches of the magnetic armature disposed in an arc of less than 180 degrees about the axis of rotation of the rotor, a shaft of rotation of the first wheel of the reduction gear being mounted next to a portion of the stator without coils.

14. The hydraulic control according to claim 13, wherein the magnetic armature and the coils, including with electrical terminals for connection to a circuit board, are overmolded in the plastic material forming the base of the casing.

15. The hydraulic control according to claim 13, wherein the motor comprises conductive wires of the coils are connected to electrical terminals formed of stamped parts inserted in or overmolded by a plastic material integrally forming the base of the casing and supporting the armature and the coils.

16. The hydraulic control according to claim 1, wherein the electric actuator comprises a connector for connecting the electronic circuit to an outer control, a casing of the connector being formed in a manner secured to the base of the casing, electrical terminals of the connector being overmolded in the base of the casing and comprising connector portions axially oriented for connection with the circuit board.

17. The hydraulic control according to claim 1, wherein it comprises a preloaded return spring acting on the valve slide, the return spring being mounted at an interface between the body of the distributor and the electric actuator, in a housing formed in the casing of the electric actuator.

* * * * *